(12) United States Patent
Kato et al.

(10) Patent No.: US 6,504,826 B1
(45) Date of Patent: Jan. 7, 2003

(54) DIGITAL BROADCASTING RECEIVER

(75) Inventors: Toshihiro Kato, Yokohama (JP); Kenji Katsumata, Yokohama (JP); Takanori Eda, Yokohama (JP); Takumi Okamura, Chigasaki (JP); Shigeru Yoneda, Yokohama (JP); Masaru Nanki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/378,766

(22) Filed: Aug. 23, 1999

(30) Foreign Application Priority Data

Aug. 24, 1998 (JP) ............................................ 10-236786

(51) Int. Cl.$^7$ ................................................ H04H 1/00
(52) U.S. Cl. ...................................................... 370/312
(58) Field of Search ................................ 370/312–319, 370/477, 228–232, 475, 352, 389; 375/240.01, 347; 348/461–468, 565–569, 564, 906, 734; 725/139, 41, 67–70, 106–119, 63; 712/36, 32–33, 41; 455/575, 420, 462, 18, 66; 379/93.07, 100.12, 100.17, 106.03, 93.11, 93.17

(56) References Cited

U.S. PATENT DOCUMENTS 5,646,942 A * 7/1997 Oliver et al. ................ 370/312
5,898,680 A * 4/1999 Johnstone et al. .......... 370/316
6,075,829 A * 6/2000 Hayashi et al. ............. 375/344
6,105,060 A * 8/2000 Rothblatt .................... 709/219

* cited by examiner

Primary Examiner—Kwang Bin Yao
Assistant Examiner—Prenell Jones
(74) Attorney, Agent, or Firm—Mattingly, Stanger & Malur, P.C.

(57) ABSTRACT

In a digital broadcasting receiver, an identification information of the image or audio signal detected from the received digital information, and an identification information stored in an identification information memory means are compared one after another. The image/audio mute means is controlled not to output a disordered image/audio signal on the basis of the comparison result. On the basis of the comparison result, the viewer is informed by the identification information output means that resolution/quality of the received image/audio signal is changed. The identification information showing the image resolution and audio quality is inserted into digital information, and the digital information with the identification information is transmitted in a digital broadcasting transmitter.

20 Claims, 6 Drawing Sheets

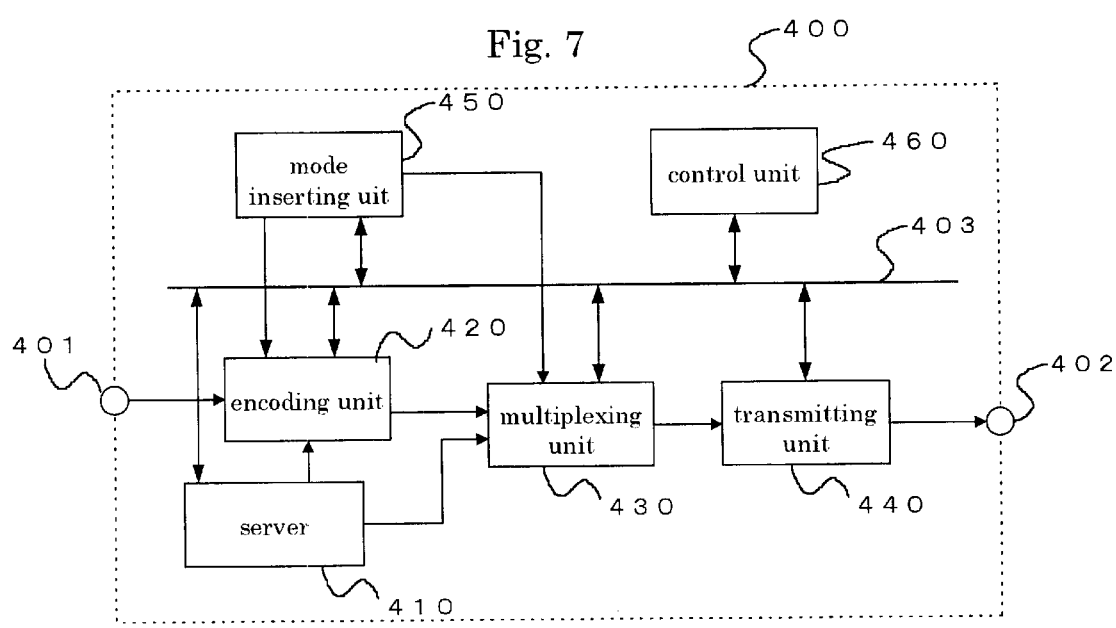

DIGITAL BROADCASTING RECEIVER

BACKGROUND OF THE INVENTION

The present invention relates to an image device that transmits and receives digital broadcasting signals, and more particularly to a digital broadcasting receiver to control the image/audio output signal with the information of the input data stream. The profile and the level of the MPEG-2, Moving Picture Experts Group 2, are stated in the specifications of ISO/IEC 13818-2. The profile of the MPEG-1 AUDIO, Moving Picture Experts Group 1 AUDIO, and MPEG-2 AAC, MPEG-2 Advanced Audio Coding, are stated in the specifications of ISO/IEC 11172-3 and ISO/IEC 13818-7.

FIG. 1 is the block diagram that shows the example of the function structure of a conventional digital broadcasting receiver.

In FIG. 1, the conventional digital broadcasting receiver 100 comprises an input terminal 101, through which a digital information signal that is modulated and multiplexed for image, audio and additional data, etc. is input. The receiver 100 also comprises receiving unit 11, demultiplex unit 12, memory unit 13, analyzing control unit 14, decoding unit 15, OSD (On Screen Display) synthesizing unit 16, and output terminal 102 which outputs an output signal from the OSD unit 16.

The analyzing control unit 14 analyzes the received information data to control each unit, and to generate OSD data. Error, which occurred at modulating or transmitting, is corrected in the receiving unit 11. The desired signal of the image, audio and additional data are extracted from the multiplexed signal in the demultiplex unit 12. A program information and other information are. stored in the memory unit 13. The demultiplexed signal is decoded in the decoding unit 15. The decoded image signal and the OSD data are synthesized in a OSD synthesizing unit 16.

The processing operation of received a digital broadcasting signal in conventional digital broadcasting receiver 100 will be described.

In conventional receiver 100, digital information multiplexed with a plurality of information is input into the input terminal 101. The input digital signal is demodulated in the receiving unit 11 and generates a demodulated bit stream. Image, audio, additional information data, and other control information are included in the digital information. The control information comprises the number of the broadcasting channel, the identification number of image/audio/additional data, information about the receiving frequency of each channel, and program information such as the program name and program contents, etc. This information is used as information for selecting the channel in digital broadcasting receiver 100.

In case the digital information of the channel selected by the viewer is received, the analyzing control unit 14 controls the demultiplex unit 12 to obtain the information about the channel selected by the input digital information. The image/audio/additional data and control information are separated from the input multiplexed digital information in the demultiplex unit 12. The separated data and the control information are stored in the memory unit 13. The separated image and audio are decoded in the decoding unit 15. The decoded image is synthesized with the OSD data in the OSD synthesizing unit 16 if necessary, and is output to an external monitor screen through the output terminal 102. The decoded audio is output to an external output device, for example, speaker, etc. through the output terminal 102.

EPG, Electronic Program Guide, is used to simplify the channel selection in the multichannel broadcasting. The EPG is displayed on the monitor screen, for example, by using the OSD signal. The EPG shows the program broadcasted at present and the program that will be broadcasted in the future. The viewer can select the desired channel by selecting the program which is displayed on the monitor without selecting a channel. In case the program that will be broadcasted in the future is selected, it is possible to reserve it to watch.

In case the EPG is displayed on the monitor screen, the analyzing control unit 14 controls the demultiplex unit 12 to acquire the program information from the input digital information. EPG data is generated based on the acquired program information, and the information readout from the memory unit 13, if necessary. The generated EPG data is output to the external output device through the output terminal 102.

In case the EPG is displayed on the monitor screen, the EPG data is converted into the OSD signal and sent to the OSD synthesizing unit 16. The OSD signal is synthesized with the decoded image and output to the external output device through the output terminal 102.

In this way, the image synthesized with the OSD signal is displayed on the monitor screen.

In case the channel is selected by using EPG, the analyzing control unit 14 acquires information about the program selected by the viewer, from the memory unit 13 or the input digital information. In addition, the analyzing control unit 14 controls the demultiplex unit 12 to separate corresponding image, audio and additional data. The separated image and the audio are decoded in the decoding unit 15 and are output to the external monitor and the external output device through the output terminal 102. As a result, the program selected by the viewer is displayed on the monitor screen.

As mentioned above, in the conventional digital broadcasting receiver 100, the desired image, audio and additional data are selected from an input data stream on the basis of the control information, and the program selected by the viewer is displayed.

SUMMARY OF THE INVENTION

Receiving the image bit stream of the same resolution is only considered in the conventional digital broadcasting receiver. For example, it is not considered that the image bit stream of MP@ML, Main Profile at Main Level that is standard resolution specified in MPEG-2, changes into the image bit stream of MP@HL, Main Profile at High Level that is high resolution specified in MPEG-2 in the same channel. It is not also considered that the image bit stream of MP@HL changes into the image bit stream of MP@ML in the same channel.

In case the changing between the image bit stream of standard resolution and of high resolution occurs every scene or program in the same channel, image signal is disordered because of a difference between the numbers of picture elements per one frame. The viewer watches the program with a feeling of displeasure.

While the above was explained about the image, it is explained about the audio as follows.

Receiving the audio bit stream of the same quality is only considered in the conventional digital broadcasting receiver likewise with the image. For example, it is not considered that the audio bit stream of MPEG-1 Audio, that is standard quality specified in MPEG1, changes into the audio bit stream of MPEG-2 AAC, that is high quality specified in MPEG-2, in the same channel. It is not also considered that the audio bit stream of MPEG-2 AAC changes into the audio bit stream of MPEG-1 Audio in the same channel.

In case the changing between the audio bit stream of standard quality and of high quality occurs every scene or program in the same channel, audio signal is also disordered because of difference of encoded rate at encoding. The viewer listens to the program with a feeling of displeasure.

It is a basic object of the present invention that the disordered image or audio signal is not displayed or output if the image or audio is disordered because of changing resolution or quality.

It is another object of the present invention that the viewer can recognize the changing of image resolution or audio quality by showing it on the monitor screen.

To achieve these objects, the digital broadcasting receiver of the present invention comprises the identification information detection means for detecting the identification information of the image or the audio from the received digital information. The identification information and an identification information already stored in the identification information memory means are compared one after another. The disordered image is not displayed on the monitor screen and the disordered audio is not output by controlling means for causing the image not to be displayed and audio mute means on the basis of the comparison result.

The disordered image is not displayed on the monitor screen and the disordered audio is not output, by controlling decoding means on the basis of the comparison result or the identification information, The viewer is informed that resolution of the received signal is changed, by controlling identification information output means on the basis of the comparison result or the identification information,.

In the digital broadcasting transmitter of the present invention, the identification information that shows the image resolution and audio quality is inserted into digital information by the identification information insertion means, and the digital information with the identification information is transmitted.

These and other features, objects and advantages of the present invention will become more apparent from the following description when taken in conjunction with the accompanying drawings.

BRIEF DESCRIPTION OF THE DRAWING

FIG. 7 is a block diagram showing an embodiment of the digital broadcasting transmitter of the present invention useable with each one of the receivers of FIGS. 2–4.

DETAILED DESCRIPTION OF PREFERRED EMBODIMENTS

The first embodiment of the present invention will now be described.

Figure 1:
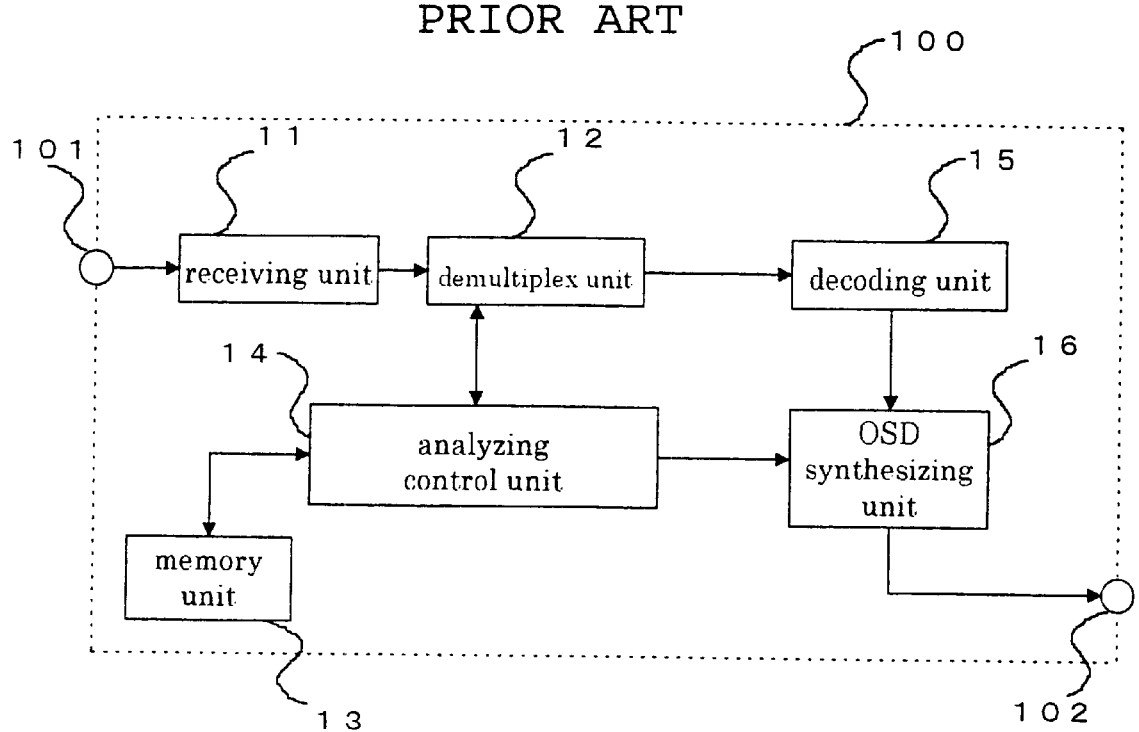
FIG. 1 is a block diagram of a conventional digital broadcasting receiver.
Figure 2:
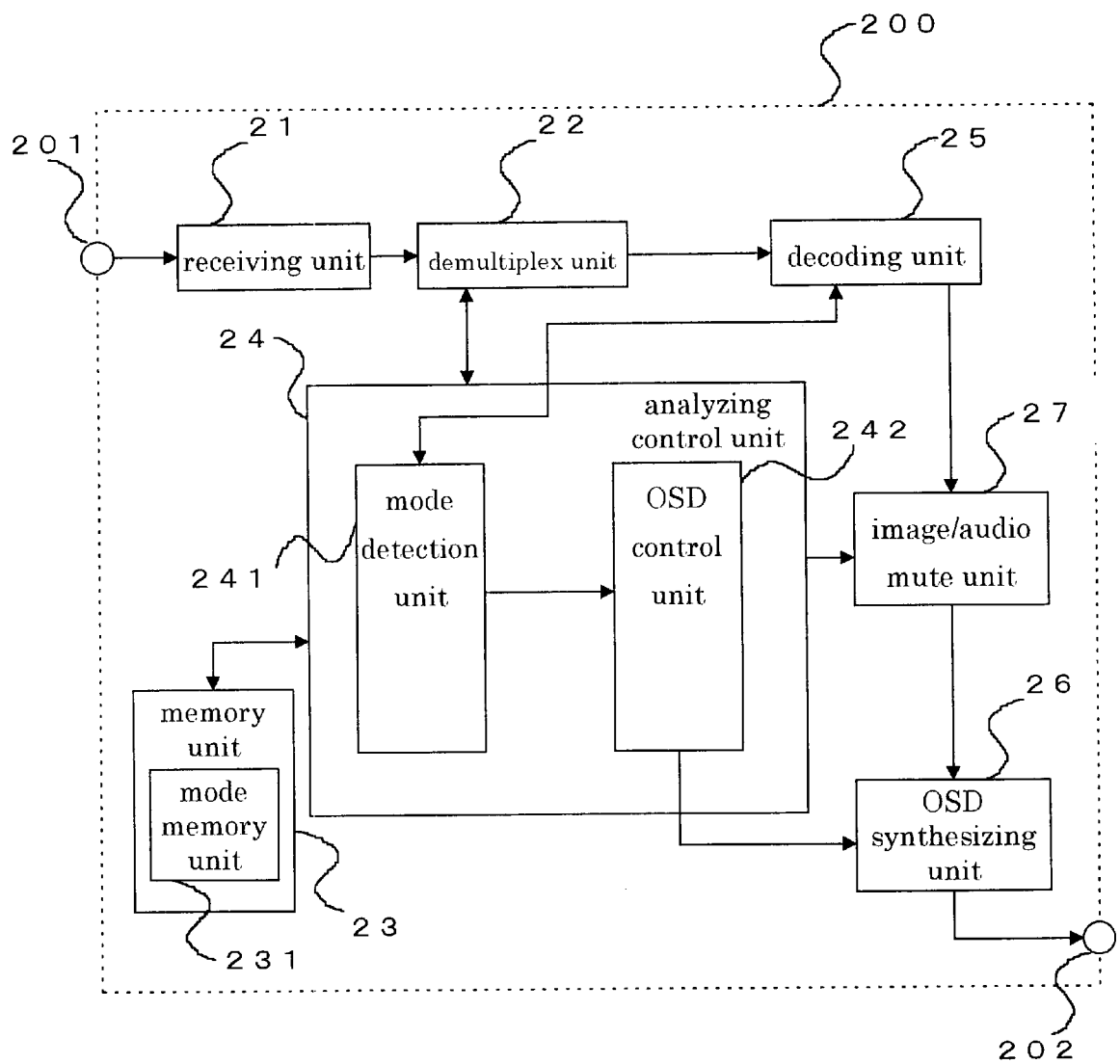
FIG. 2 is a block diagram showing an embodiment of the digital broadcasting receiver of the present invention.

FIG. 2 is the block diagram that shows an example of the digital broadcasting receiver applied to multichannel digital broadcasting.

In FIG. 2, a digital information signal of modulated and multiplexed image, audio and control data, etc. is input through an input terminal 201. Digital broadcasting receiver 200 comprises input terminal 201, receiving unit 21, demultiplex unit 22, memory unit 23, analyzing control unit 24, decoding unit 25, OSD (On Screen Display) synthesizing unit 26, image and audio muting unit 27, and output terminal 202 through which a decoded signal is output to the external output device.

A displaying/audio mode, which indicates image quality/resolution or audio quality, is detected in mode detection unit 241. An analyzing control unit 24 comprises the mode detection unit 241 and OSD control unit 242 which controls OSD synthesizing unit based on the detected the displaying/audio mode. Received digital information signal is analyzed and the OSD data is generated in the analyzing control unit 24.

Received digital information signal is demodulated, and error that occurred at transmitting is corrected in the receiving unit 21. In a demultiplex unit 22, desired image, audio and additional data are extracted from the multiplexed signal. Memory unit 23 comprises mode memory unit 231, in which the displaying/audio mode is stored. The digital signal demultiplexed in the demultiplex unit 22 is decoded and the image signal and the audio signal are generated in a decoding unit 25. The decoded image signal and the OSD data are synthesized in a OSD synthesizing unit 26. In an image/audio mute unit 27, the decoded image signal from the decoding unit 25 is controlled by a command sent from the analyzing control unit 24 to be output or not. The decoded audio signal is also controlled by the command to be output or not in a image/audio mute unit 27.

In this embodiment, the change of the displaying/audio mode indicates change from the standard image resolution to the high image resolution, and indicates change from the standard audio quality to the high audio quality. In case of the image, the change of the displaying/audio mode means the change of the encoding method such as changing between MP@ML and MP@HL specified in MPEG-2, or the change of the picture quality such as changing standard picture quality of conventional TV and the high picture quality of the HDTV, High Definition TV. In case of the audio, the change of the displaying/audio mode means change of the encoding method such as changing between MPEG-1 AUDIO and MPEG-2 AAC specified in MPEG. The change of the encoding method also means changing between MP@ML and MP@HL, or between MP@ LL (Main Profile at Low Level) and MP@HL.

In this embodiment, the change of resolution in the same profile or the same level is also included in the change of the displaying/audio mode, because several resolutions are defined in the same profile and the same level in MPEG-2.

As mentioned above, the displaying mode shows the resolution, picture quality or encoding method of the image. The audio mode shows the audio quality or encoding method of the audio in this embodiment.

Processing operation of input digital information from receiving to outputting will be described.

Receiving multichannel digital broadcasting, the digital signal that is a multiplexed signal of a plurality of compressed image/audio data and several information showing receiving channel information or program information, etc. is input into the input terminal 201. The several information also includes a control data, for example specified in the standard of MPEG. The digital signal is demodulated in the receiving unit 21. The demodulated digital signal is separated based on the command sent from the analyzing control unit 24 in the demultiplex unit 22. The encoded image data and the encoded audio data are sent to decoding unit 25, and the control information such as program information, etc. is transmitted to memory unit 23.

The digital data, that includes encoded image data and encoded audio data separated in the demultiplex unit 22, is decoded in decoding unit 25. The decoded image data and the audio data are sent to image/audio mute unit 27, and the decoded image data is also sent to the OSD synthesizing unit 26. The decoded image data and the audio data sent from decoding unit 25 are muted, not output, on the basis of the command sent from the analyzing control unit 24 in image/audio mute unit 27.

In the OSD synthesizing unit 26, the digital data, which is the decoded image/audio data or the muted data sent from the image/audio mute unit 27, is synthesized with OSD data on the basis of the command sent from the OSD control unit 242. In the OSD synthesizing unit 26, even in case image data is not sent from decoding unit 25, the OSD signal is generated and is output based on the command sent from the OSD control unit 242.

As mentioned above, the decoded image signal and the OSD data are synthesized, and the OSD signal is generated.

Then, one example of the detection of the displaying/audio mode in this embodiment will be described.

In digital broadcasting receiver 200, the analyzing control unit 24 controls demultiplex unit 22, and the control information included in the input digital information is separated. The control information determined by the broadcasting station includes program information such as information concerned with the number of the channel, the identification number of image/audio/data, the program name, program contents, and the receiving frequency of each channel. In addition, the control information also includes the displaying/audio mode. The displaying/audio mode is detected based on the control information in mode detecting unit 241. The control information is stored in memory unit 23, the displaying/audio mode is stored in a mode memory unit 231.

For example, the control information is PMT, Program Map Table which shows identification numbers of the receiving image/audio, specified in ISO/IEC 138181-1. The analyzing control unit 24 controls demultiplex unit 22, and the PMT is separated from the input digital information. By analyzing the PMT the displaying/audio mode is detected in the mode detecting unit 141, and the displaying/audio mode is stored in the mode memory unit 231.

Then, another example of the detection of the displaying/audio mode in this embodiment will be described.

The image/audio bit stream separated in the demultiplex unit 22 is sent to the decoding unit 25 and decoded. For example, in case the displaying mode is inserted into the header of the image bit stream, the analyzing control unit 24 controls the decoding unit 25. The image bit stream is decoded in the decoding unit 25. The displaying mode is detected from the header in the mode detection unit 241, and stored in the mode memory unit 231. In case the audio mode is also inserted into the header of the audio bit stream, the analyzing control unit 24 controls the decoding unit 25. The audio bit stream is decoded in the decoding unit 25. The audio mode is detected from the header in the mode detection unit 241, and stored in the mode memory unit 231.

Thus, whenever the received image or program is changed, whenever the control information including the displaying/audio mode is received, or whenever the bit stream including the displaying/audio mode is received, the displaying/audio mode is detected in the mode detecting unit 241 and the displaying/audio mode is stored in the mode memory unit 231.

Then, the method, which prevents the disordered image/audio from being displayed whenever the resolution of the image and/or audio quality of the received digital data is changed, will be described.

As mentioned above, in the digital broadcasting receiver 200, the displaying/audio mode is stored in the mode memory unit 231. After that, in a case where the next displaying/audio mode, secondly transmitted, is detected in the mode detecting unit 241, the analyzing control unit 24 controls the mode memory unit 231 to readout the displaying/audio mode already stored.

In case the readout displaying/audio mode and the next displaying/audio mode are the same, the analyzing control unit 24 controls the demultiplex unit 22 and the decoding unit 25 to detect the displaying/audio mode transmitted following further. In case the readout displaying/audio mode and the next displaying/audio mode are different, the analyzing control unit 24 controls the OSD synthesizing unit 26 and the image/audio mute unit 27 to prevent the disordered image signal from being displayed and the disordered audio signal from being output.

In the image/audio mute unit 27, the image signal is muted based on the command, namely the decoded image signal is changed into predetermined image signal not to display the disordered image. The muted image signal is transmitted to the OSD synthesizing unit 26. In this case, OSD control unit 242 does not have to control the OSD synthesizing unit 26. In the OSD synthesizing unit 26, the muted image signal is output through the output terminal 202 as it is. The audio signal is also muted based on the command in the image/audio mute unit 27. The muted audio signal is output through the output terminal 202 as it is.

On the other hand, a method of preventing the disordered image from being displayed by controlling the OSD synthesizing unit 26, will be described. When it is detected that the displaying mode is changed, the OSD synthesizing unit 26 is controlled by the analyzing unit 24 through the OSD control unit 242 to display the OSD signal on all areas of the monitor screen.

Figure 5:
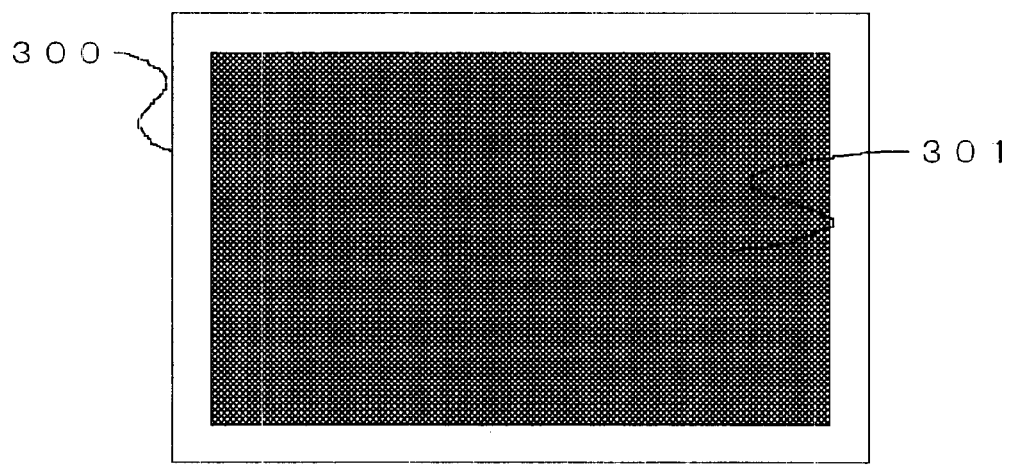
FIG. 5 is a diagram showing an example output on a monitor screen of the external display device.
Figure 6:
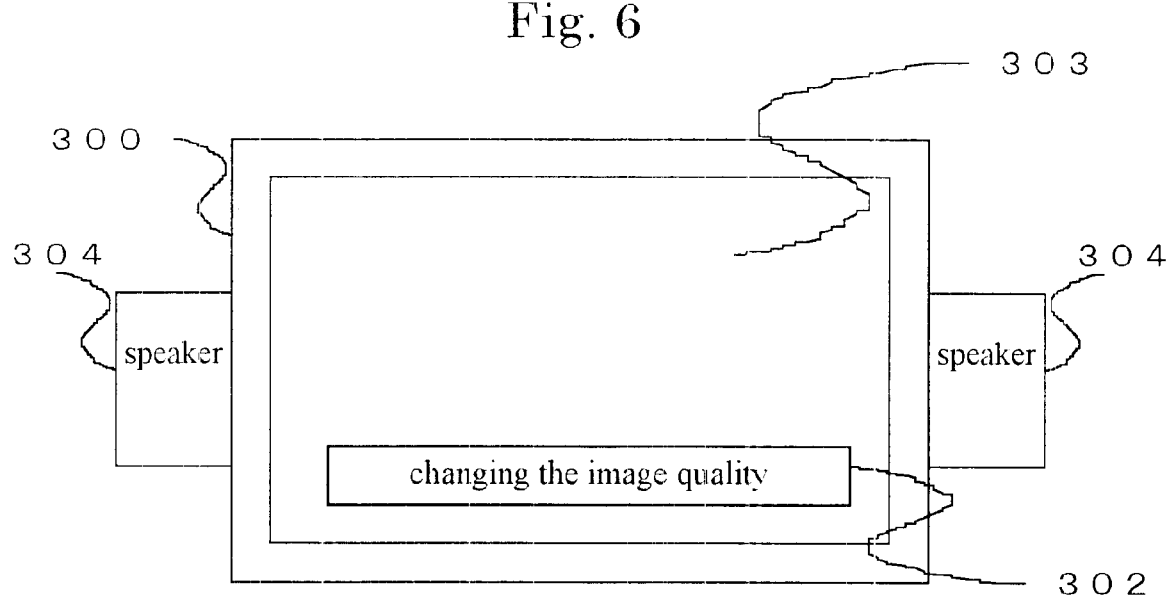
FIG. 6 is a diagram showing another example output on a monitor screen of the external display device.

In the OSD synthesizing unit 26, on the basis of the command, the image signal sent from the decoding unit 25 is synthesized with OSD data which is for example predetermined level data, and the synthesized signal is output through the output terminal 202. FIG. 5 and FIG. 6 are the figure that illustrates an example of the monitor screen of external display 300 in case the disordered image is prevented from being displayed by the present invention. Numeral 301 in FIG. 5 and numeral 303 in FIG. 6 represent the predetermined image data on the monitor screen.

At this time, changing of the displaying mode can be displayed on the monitor screen by using the analyzing unit 24 and the OSD synthesizing unit 26 to inform the viewer. FIG. 6 shows the figure that illustrates an example of the monitor screen of external display 300 in case the image is changed from standard resolution to high resolution. Displaying on the front panel installed in the digital broadcasting receiver, and outputting the audio or the alarm can be also used as other information methods,.

In this way, whenever the resolution of the image or audio quality is changed, or whenever the displaying/audio mode is changed, displaying the disordered image and outputting the disordered audio can be prevented.

The embodiments, where the displaying/audio mode is inserted into the header of the control information or of the image/audio bit stream, have been described.

In case the displaying/audio mode is not inserted, displaying the disordered image and outputting the disordered audio can be prevented as follows. The control information including the PMT in connection with the change of resolution is transmitted before the resolution of the image actually is changed. The PMT is standardized in ISO/IEC 13818-1, and shows identification numbers of the received image/audio. PMT version number is inserted into the PMT, which increases by one, with every changing of the PMT. Several seconds before changing the resolution of the image or the audio quality, the version number is increased by one and transmitted from the broadcasting station.

In digital broadcasting receiver 200, the analyzing control unit 24 controls the demultiplex unit 22 to separate the PMT, and the version number is detected. After detection, the analyzing control unit 24 controls the memory unit 23 to store the version number, and the next version number is detected from PMT transmitted. The analyzing control unit 24 controls the memory unit 23 to readout the version number. The readout version number is compared with the next version number detected from PMT.

In case the next version number detected from PMT is not equal to the version number already stored, the analyzing control unit 24 controls the OSD synthesizing unit 26 and the image/audio mute unit 27 to prevent the disordered image signal from being displayed and the disordered audio signal from being output.

The analyzing control unit 24 controls the decoding unit 25 to stop decoding, and the image/audio mute unit 27 to mute the image/audio signal. Especially in case of the image, the OSD synthesizing unit 26 is controlled to display the OSD signal on all areas of the monitor screen.

As mentioned above, whenever the quality of the resolution of the image or the audio is changed, displaying the disordered image or outputting the disordered audio can be prevented by using the version number of PMT. Displaying the disordered image or outputting the disordered audio can be also prevented on the basis of the change of the displaying/audio mode by using the version number of the PMT.

In FIG. 2, the digital broadcasting receiver 200 includes both image/audio mute unit 27 and the OSD synthesizing unit 26 for preventing displaying the disordered image or outputting the disordered audio. However, as mentioned above, the present invention can be realized by comprising one of these units as shown in FIG. 3 or FIG. 4.

Figure 3:
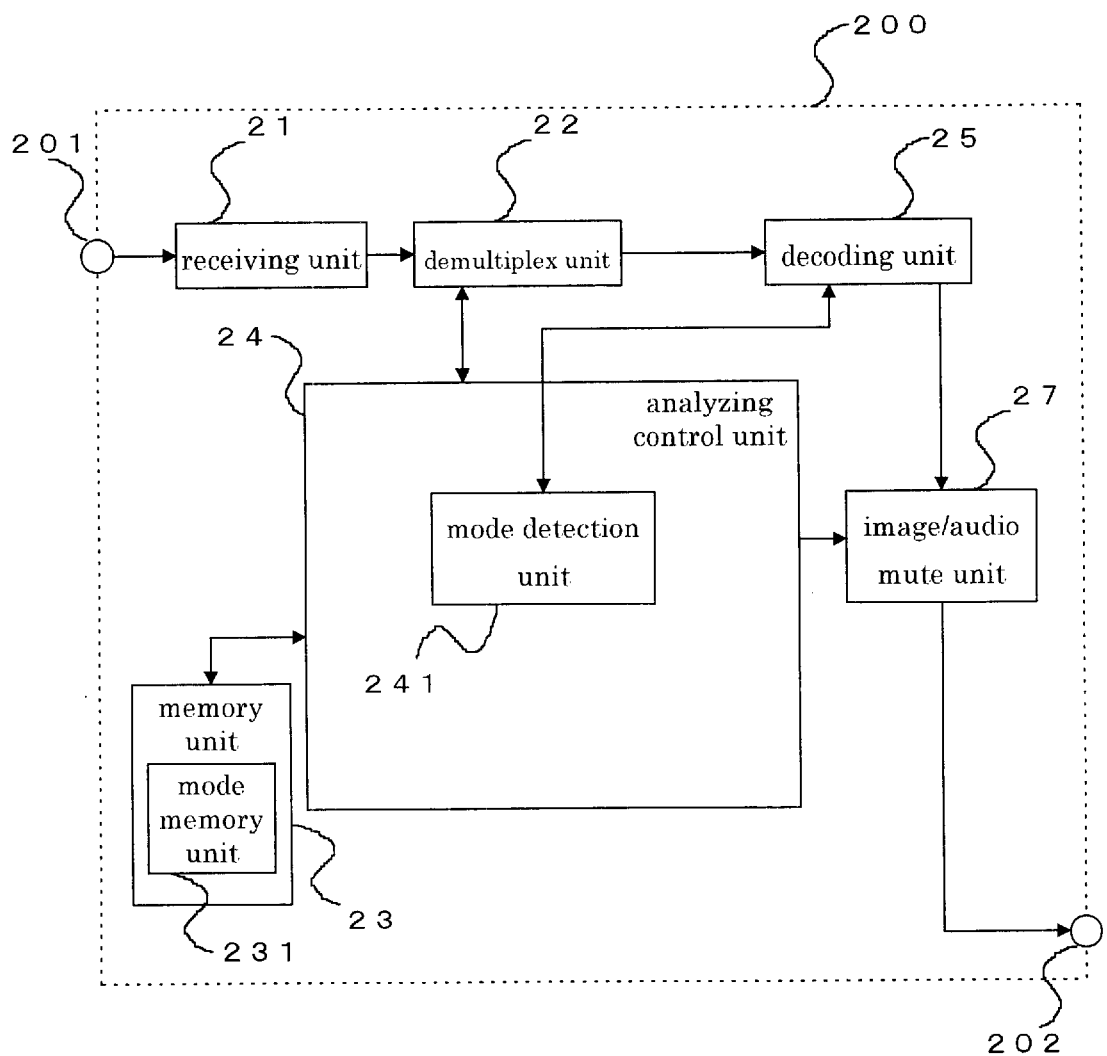
FIG. 3 is a block diagram showing another embodiment of the digital broadcasting receiver of the present invention.

FIG. 3 is the block diagram that shows one embodiment of the digital broadcasting receiver comprising only the image/audio mute unit 27 for preventing displaying the disordered image or outputting the disordered audio.

Figure 4:
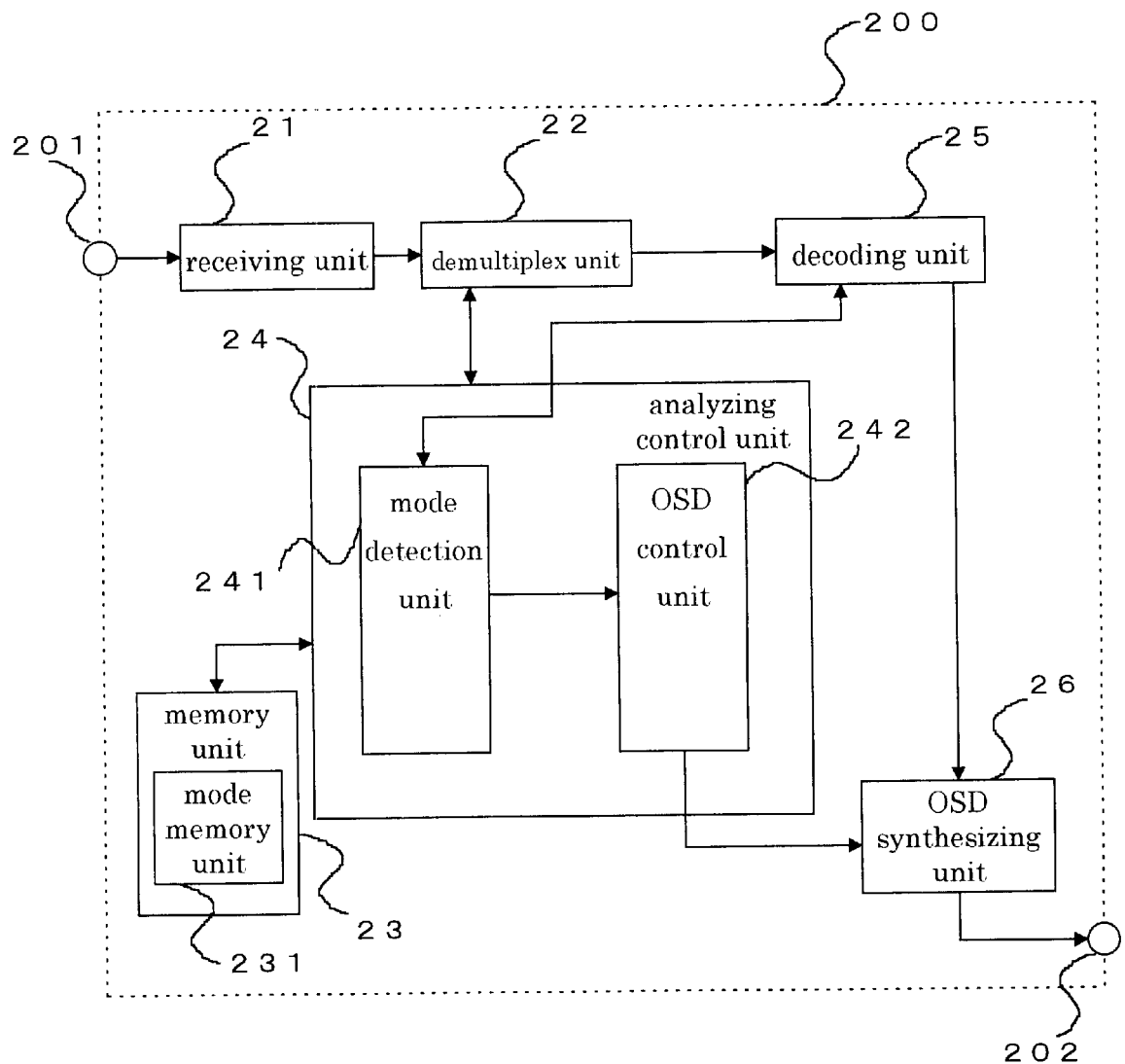
FIG. 4 is a block diagram showing a third embodiment of the digital broadcasting receiver of the present invention.

FIG. 4 is the block diagram that shows one embodiment of the digital broadcasting receiver comprising only the OSD synthesizing unit 26 for preventing displaying the disordered image or outputting the disordered audio.

The embodiments, that prevent the disordered image from being displayed and the disordered audio from being output by using the OSD synthesizing unit 26 or the image/audio mute unit 27, have been described. However, the disordered image/audio can be prevented from being displayed or output by using the decoding unit 15, without the OSD synthesizing unit 26 and the image/audio mute unit 27.

That is, in the digital broadcasting receiver 200, the displaying/audio mode is detected by the method that is similar to the above method and sent to the analyzing control unit 24.

In case the image resolution or audio quality is changed, the displaying/audio mode is so analyzed by the analyzing control unit 24 that the decoding unit 25 is controlled to stop decoding. Preferably, an image which was decoded just before changing resolution is continuously output and the audio is muted. This embodiment has been described that decoding unit 25 is controlled to prevent displaying the disordered image/audio without utilizing the particular information.

The end identification information, that shows the last digital bit stream just before the image resolution or the audio quality is changed, is added to the bit stream at transmitting. Then it is realized to prevent the disordered image/audio from being output by controlling the decoding unit 25 to stop decoding, if the end identification information is detected.

It is also realized to prevent the disordered image/audio from being output by controlling the decoding unit 25 to stop decoding if change of the PMT version number is detected. A changing information, that shows change of resolution or change of audio quality, is added to the control information at transmitting. Then it is realized to prevent the disordered image/audio from being output by using the changing information instead of using the displaying/audio mode.

Then, after changing of the image resolution or audio quality, an example of processing to restart displaying the image or outputting the audio will be described.

First, it is shown about processing operation after controlling image/audio mute unit 27 to mute the image/audio signal. In FIG. 2, after muting the image/audio, the analyzing control unit 24 controls the demultiplex unit 22 to separate the image/audio bit stream which was transmitted after changing of the image resolution or audio quality. The separated bit stream is sent to the decoding unit 25 to decode. After decoding the bit stream, a command about restarting of the decode is sent to the analyzing control unit 24 from the decoding unit 25. According to the command, the analyzing control unit 24 controls the image/audio mute unit 27 not to mute the image/audio signal. The decoded image is output to external display or monitor through the OSD synthesizing unit 26 and the output terminal 202. The decoded audio is output to external output device, for example, speaker 304, etc. through the output terminal 202.

In this way, the image after changing image resolution is displayed on the monitor screen, and the audio after changing audio quality is output to speaker.

Secondly, it is shown about the processing operation after controlling the OSD synthesizing unit 26 to prevent the disordered image from being displayed. The analyzing control unit 24 controls the OSD synthesizing unit 26 not to synthesize the image with the OSD data through the OSD control unit 242.

In this way, the image after changing image resolution is displayed on the monitor screen.

Thirdly, it is shown about the processing operation after controlling the decoding unit 25 to prevent the disordered image/audio from being output. The analyzing control unit 24 controls the demultiplex unit 22 to separate the image/audio bit stream which was transmitted after changing of the image resolution or audio quality. The separated bit stream is sent to the decoding unit 25 to decode. The analyzing control unit 24 controls the decoding unit 25 to restart decoding. Then, the image/audio signal is output, if the image/audio bit stream is decoded normally.

In this way, the image after changing image resolution is displayed on the monitor screen, and the audio after changing audio quality is output to speaker.

The embodiment, controlling the decoding unit 25 to prevent the disordered image/audio from being output, has been described without controlling the OSD synthesizing unit 26 and the image/audio mute unit 27. However, it is also applicable to control the OSD synthesizing unit 26 and the image/audio mute unit 27 with controlling the decoding unit 25.

As mentioned above, in case the image changes between standard resolution and high resolution, the disordered image can be prevented from being displayed on the monitor screen to synthesize the image with the OSD data, to mute the image, or to stop decoding the image bit stream.

In case the audio changes between standard quality and high quality, the disordered audio can be also prevented from being output to the external output device to mute the audio, or to stop decoding the audio bit stream.

Further, in case the image/audio changes between standard resolution/quality and high resolution/quality, the viewer can watch and listen to the program without feeling displeasure by showing on the monitor screen that the resolution or quality was changed.

An embodiment of the digital broadcasting transmitter of the present invention showing in FIG. 7 will now be described.

In a digital broadcasting transmitter 400, compressed image data, compressed audio data, non-compressed image data, and non-compressed audio data are stored in a server 410. The server 410 is controlled by a command sent from control unit 460 to readout a designated data stream. Then, the non-compressed image/audio data is sent to encoding unit 420, and compressed image/audio data is sent to multiplexing unit 430. The image/audio data, from the server 410 or from the outside of the transmitter 400, is input through input terminal 401, encoded in the encoding unit 420 and transmitted to the multiplexed unit 430. The designated data stream is multiplexed and is transmitted to transmitting unit 440. If the designated data stream is a pay program, the data stream is sent to scrambling unit (not shown) and the scrambled data is sent to transmitting unit 440 with key information to descramble. The multiplexed digital information is modulated and transmitted to a plurality of the digital broadcasting receiver from the transmitting unit 440. An optical fiber coaxial cable digital communication satellite, etc. are applicable as a transmission means from the transmitter 400 to a plurality of digital broadcasting receiver 200. Mode inserting unit 450 controls the multiplexing unit 430 to multiplex the displaying/audio mode with the encoded image/audio data sent from encoding unit 420. In addition, in case the displaying/audio mode is changed, the end identification information or the PMT version number is multiplexed if necessary. Thus, the displaying/audio mode is added to the digital information, and transmitted. Then, receiving the digital information with digital broadcasting receiver 200, the received digital information is analyzed, and the displaying/audio mode at present can be detected.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

What is claimed is:

1. A digital broadcasting receiver for receiving a multiplexed signal having at least user's data and identification information related to quality of the user's data, the receiver comprising, a demultiplexer, decoder, and controller, the digital broadcast receiver comprising:

a mode detection unit extracting the identification information from demultiplexed desired data, and a mute unit preventing decoded data from outputting in response to detected change in quality.

2. A digital broadcasting receiver for receiving a multiplexed signal having at least user's data and identification information related to quality of the user's data, said receiver comprising:

demultiplexing means for extracting desired data from the multiplexed signal;

means for extracting the identification information from the demultiplexed desired data;

means for detecting a change in quality based on the identification information;

means for decoding the demultiplexed desired data;

mute means for preventing the decoded data from outputting in response to the detected change in quality.

3. The receiver of claim 2, wherein the mute means comprises:

means for controlling the decoding means to stop decoding and to output predetermined data, in response to the detected change in quality.

4. The receiver of claim 2, wherein the mute means comprises:

OSD means for generating OSD data to be synthesized with the decoded data; and means for controlling the OSD means to synthesize the OSD data with the decoded data for preventing the decoded data from being displayed on a external monitor screen, in response to the detected change in quality.

5. The receiver of claim 2, wherein the mute means comprises:

means for switching the decoded data to predetermined mute data; and means for controlling the switching means to output the mute data in response to the detected change in quality.

6. The receiver of claim 3, wherein the user's data is image data.

7. The receiver of claim 3, wherein the user's data is audio data.

8. The receiver of claim 3, wherein the output predetermined data is output freezing image data which has already been decoded.

9. The receiver of claim 3 further comprising:

restarting means for controlling the mute means to restart outputting the decoded data, when the demultiplexed desired data is decoded normally.

10. The receiver of claim 4, wherein the controlling means further controls the OSD means to generate the OSD data for informing user of changing the image quality.

11. The receiver of claim 4 further comprising:

means for stopping the decoding means in response to the detected change in quality.

12. The receiver of claim 4 further comprising:

restarting means for controlling the mute means to restart outputting the decoded data, when the demultiplexed desired data is decoded normally.

13. The receiver of claim 4, wherein the user's data is image data.

14. The receiver of claim 4, wherein the user's data is audio data.

15. The receiver of claim 5 further comprising:

means for stopping the decoding means in response to the detected change in quality.

16. The receiver of claim 5 further comprising:

restarting means for controlling the mute means to restart outputting the decoded data, when the demultiplexed desired data is decoded normally.

17. A method for receiving a multiplexed signal having at least user's data and identification information related to quality of the user's data, said method comprising:

extracting desired data from the multiplexed signal;

extracting the identification information from the demultiplexed desired data;

detecting a change in quality based on the identification information;

decoding the demultiplexed desired data;

preventing the decoded data from outputting upon detecting a change in quality.

18. The method of claim 17, wherein the preventing step comprises:

stopping decoding and outputting predetermined data, in response to the detected change in quality.

19. The method of claim 17, wherein the preventing step comprises:

generating OSD data to be synthesized with the decoded data; and synthesizing the OSD data with the decoded data to prevent the decoded data from being displayed on a external monitor screen, in response to the detected change in quality.

20. The method of claim 17, wherein the preventing step comprises:

switching the decoded data to predetermined mute data; and outputting the mute data in response to the detected change in quality.

* * * * *